United States Patent [19]

Piereder

[11] Patent Number: 4,651,498
[45] Date of Patent: Mar. 24, 1987

[54] MEAT PACKAGING APPARATUS

[76] Inventor: Ludwig Piereder, Squire Ct., R.R. #1, Waterloo, Ontario, Canada, N2J 4G8

[21] Appl. No.: 757,999

[22] Filed: Jul. 23, 1985

Related U.S. Application Data

[63] Continuation-in-part of Ser. No. 539,575, Oct. 6, 1983, Pat. No. 4,565,054.

[51] Int. Cl.$^4$ ............................................. A22C 11/04
[52] U.S. Cl. ........................................ 53/122; 53/517; 53/576; 17/38; 17/32; 17/49
[58] Field of Search ................... 17/1 F, 1 R, 32, 33, 17/35, 36, 38, 39, 49; 53/122, 469, 505, 511, 517, 530, 576

[56] References Cited

U.S. PATENT DOCUMENTS

| | | | |
|---|---|---|---|
| 2,397,812 | 4/1946 | Russell et al. | 53/122 |
| 3,462,793 | 8/1969 | Sumption | 53/517 X |
| 3,616,594 | 11/1971 | Graf | 53/122 |
| 3,703,064 | 11/1972 | Lugiewicz | 53/122 |
| 4,091,504 | 5/1978 | Wong | 17/32 |
| 4,257,145 | 3/1981 | Bovino | 17/32 |
| 4,483,046 | 11/1984 | Briddell | 17/32 |

FOREIGN PATENT DOCUMENTS 2843624 8/1979 Fed. Rep. of Germany .......... 17/38

Primary Examiner—Willie G. Abercrombie
Attorney, Agent, or Firm—Kenneth M. Garrett

[57] ABSTRACT

Apparatus for stuffing meat into a casing mounted on a horn comprising a pair of plates mounted in facing relationship, on one of which plates the horn is mounted, and on the other a meat supply conduit, together with a ram. The plates are relatively movable between a first station at which the conduit and horn are in communication, and a second station at which the ram and conduit are in communication, the ram serving to extrude meat contained in the horn into the casing. A knife is inlaid into one or both plates to sever meat bridging the horn and conduit when the plates are relatively moved. In the preferred embodiment the plates are mounted on an elongated shaft for rotary movement, and the shaft is itself mounted so as to be axially movable, so as to transmit a clamping pressure to retain the plates together. When the clamping pressure is released the plates can be relatively moved along the shaft for cleaning and maintenance purposes.

17 Claims, 12 Drawing Figures

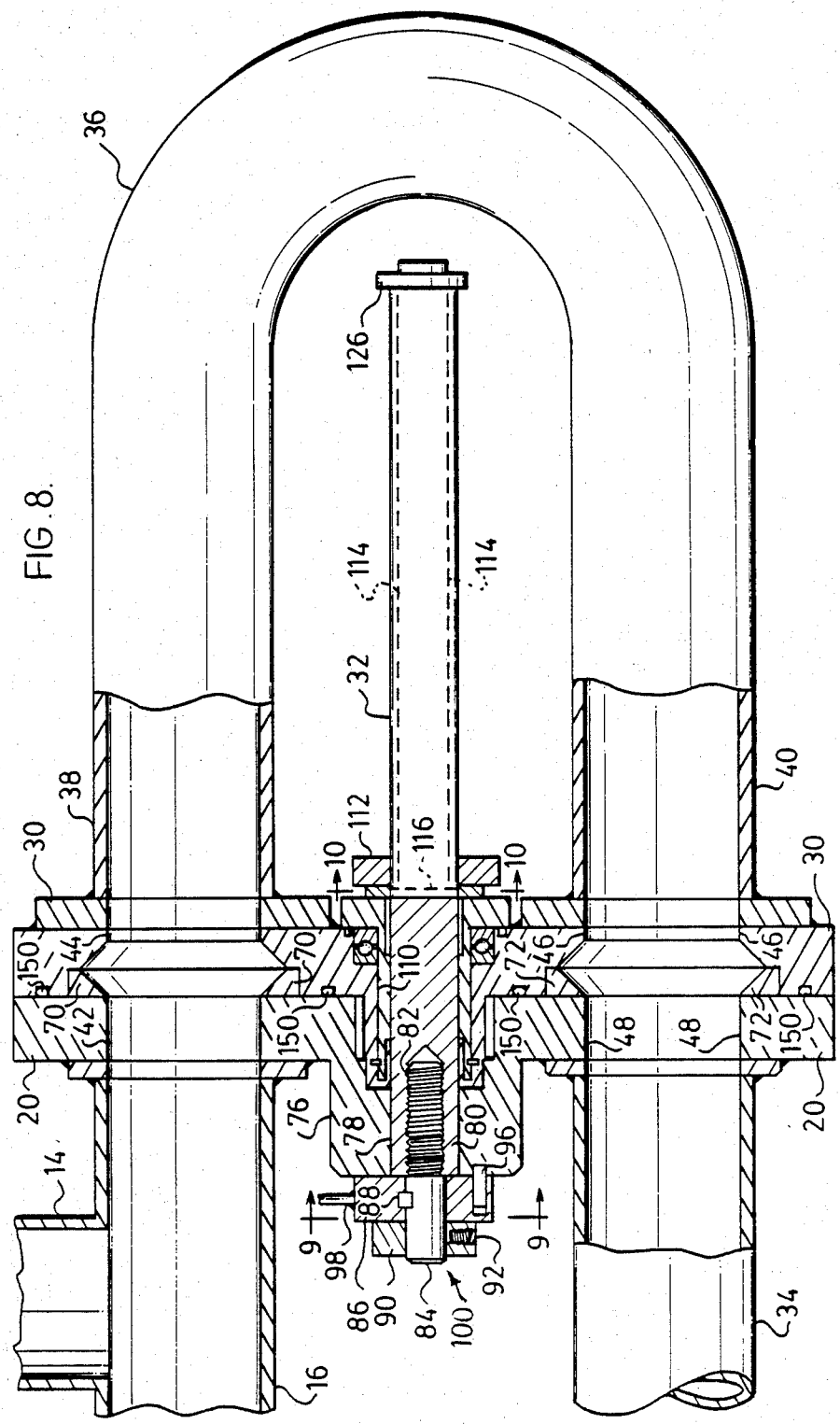

4,651,498

MEAT PACKAGING APPARATUS

This application is a continuation-in-part of U.S. patent application Ser. No. 539,575 filed Oct. 6, 1983 titled Meat Packaging Apparatus, now U.S. Pat. No. 4,565,054.

FIELD OF THE INVENTION

This invention relates to food machinery. It particularly relates to machinery for handling meat, especially whole muscle meat such as ham. While it is described in respect of this application, the invention is not necessarily restricted thereto.

BACKGROUND OF THE INVENTION

The stuffing of meat into casings is well known in the art. In accordance with general principles a casing is located on a horn, and meat extruded into the casing, which is tied off periodically to provide discrete packages. Difficulty arises when it is required to pack a precise quantity of meat into each discrete package. Thus in whole muscle meats such as ham, a relatively large portion of meat may locate where it is desired to tie off the package. The problem may be overcome by severing the meat at a pre-determined juncture prior to the meat being encased. In accordance with one proposal, a radial knife is provided immediately adjacent the end of the horn. Actuating mechanism for the knife cannot locate on the exterior of the horn due to the location of the casing thereon. Such knife actuating mechanism must therefore pass along the interior of the horn, thereby serving to restrict its diameter. Perhaps more importantly, the knife itself serves as a serious restriction, the effective diameter of the horn in the vicinity of the knife being approximately one half the actual internal diameter.

In accordance with other proposals, the horn itself may serve to measure the desired portion of meat to be packed; however, this necessitates changing horns for each different amount to be packed. It also becomes impractical when the amount to be packed is relatively small, as this severely limits the amount of casing that can be stored on the horn.

It is a prime object of the invention to provide apparatus of the aforementioned type which can be employed to pack widely differing quantities of product with reasonable accuracy without necessitating changing component parts.

It is a further object of the invention to provide such apparatus which is substantially devoid of flow restriction.

SUMMARY OF THE INVENTION

In accordance with the foregoing, these and other objects as will become apparent from the ensuing description of the invention are broadly fulfilled in one aspect of the invention by apparatus comprising a horn, and a supply conduit therefor. The horn is mounted from the first of a pair of interfacing plates, which are relatively movable between first and second stations, the conduit from the others. At the first station, the conduit connects to the horn, and meat is extruded therethrough. A knife is carried on at least one of the plates at the interface, and is located so that as the plates are relatively moved towards the second station, the knife shears meat bridging the conduit and the horn. A ram cylinder is mounted from the second of the plates, whereby the ram carried in the cylinder is aligned with the horn at the second station. Activation of the ram then forces the meat contained within the horn into the casing. The cycle is completed by withdrawal of the ram from the horn, and the relative movement of the plate, to the first station. The first plate also serve to seal whichever of the conduit and ram that is not connected to the horn, and the second plate seals the entrance to the horn during the movement between the first and second stations, thereby reducing the possibility of contamination.

In accordance with another aspect of the invention the conduit is U shaped, the inlet end thereof mounting from the second plate. A supply tube mounts from the first plate so as to connect to the inlet end of the conduit when the plates are positioned at the first station to align the horn and the conduit exit. Preferably one or more other knives is provided between the facing surfaces of the plates to sever meat at the juncture of the supply tube and the inlet end of the conduit as the plates are relatively moved. The plates act to seal the exit to the supply tube and the entrance to the conduit when they are not interconnected.

In accordance with a preferred aspect of the invention, the plates are mounted for rotary relative movement about a central shaft. Expediently, the shaft also provides a travel path along which the plates may be relatively moved in an axial direction for cleaning and maintenance purposes.

In accordance with another preferred aspect of the invention, the shaft is axially movable, whereby it serves to transmit a clamping pressure between the plates.

BRIEF DESCRIPTION OF THE DRAWINGS

These aspects and other aspects, objects and advantages of my invention will be further described in relation to the accompanying drawings wherein:

FIG. 8 is a fragmentary section along 8—8 of FIG. 4;

DESCRIPTION OF ILLUSTRATED EMBODIMENTS

Figure 1:
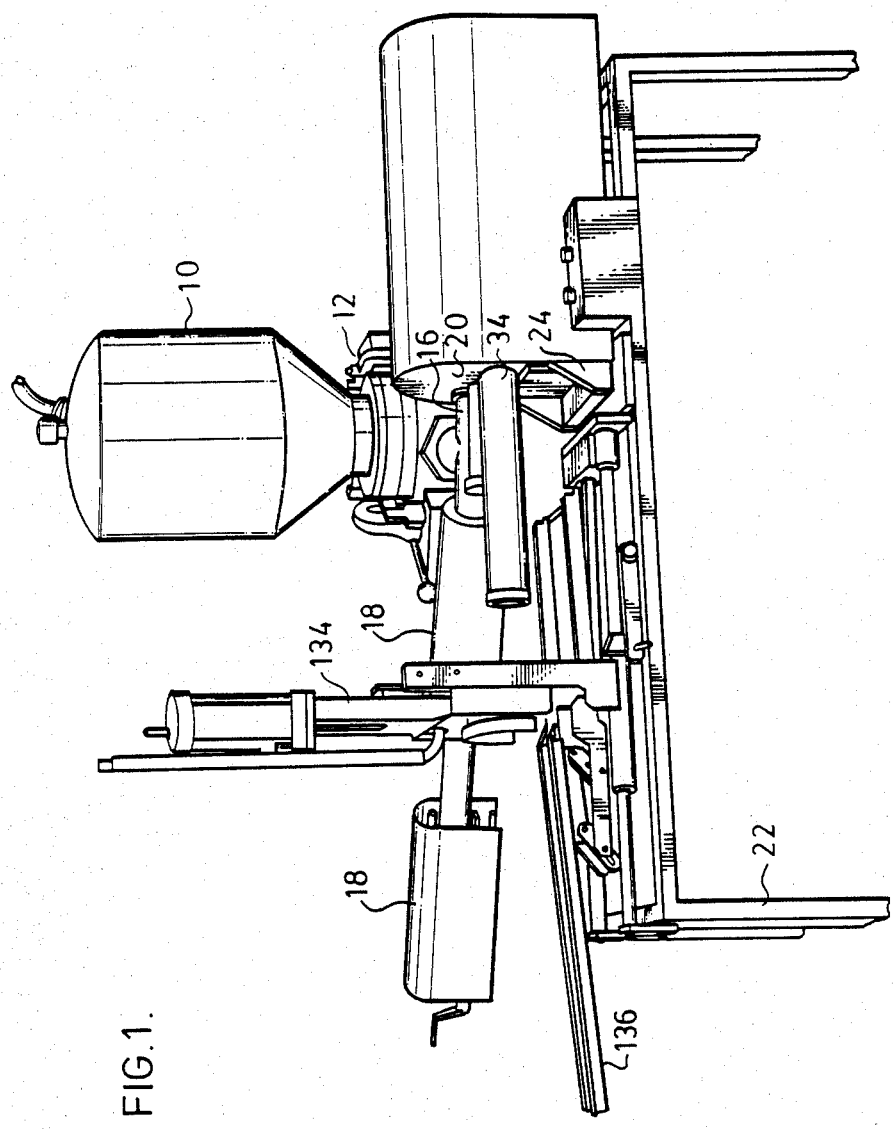
FIG. 1 is a perspective general view of apparatus embodying the invention.

Referring to FIG. 1, a meat packaging apparatus comprises a meat hopper 10 wherein a supply of whole muscle meat such as hams is stored for packaging, surmounting a meat pump 12. Meat pump 12 has an exit tube 14 which tees into a supply tube 16. One end of the supply tube 16 connects to a meat portioner 18, while the other end connects to and is mounted from a mounting plate 20, which is upstanding from the frame 22 of the meat packaging apparatus and rigidly connected thereto by a bracket 24.

Referring now to FIG. 8, a second plate 30 is mounted in facing relation from mounting plate 20 on the rearward facing side thereof by an axially extending shaft 32 about which plate 30 is rotatable. A horn 34 mounts from plate 20 on a diameter thereof containing supply tube 16. A U shaped conduit 36 having an inlet end 38 and an outlet end 40 mounts to rotary plate 30, the ends 38 and 40 being opposed to supply tube 16 and horn 34 so as to interconnect same, plates 20 and 30 being apertured at 42, 44, 46 and 48 for this purpose.

As best seen in FIGS. 4–7 inclusive, a cylinder 50 mounts from rotary plate 30 in quadrature to the inlet and outlet ends 38, 40 of conduit 36, to surround an aperture 52 in plate 30. A pneumatic motor 54 has a connecting rod 56 which connects the motor 54 between the frame 22 and rotary plate 30, and is actuatable to drive plate 30 between first and second stations, seen respectively in FIGS. 4 and 5. Cylinder 50 forms part of a second pneumatic motor 60 having a connecting rod 62 which extends therefrom and which terminates in a ram 64. An air bleed path 66 may be noted in the wall of cylinder 50 intermediate the ram 64 and motor 60.

A knife blade 70 is let into plate 30, to surround the aperture 44 at the inlet end 38 of conduit 36. A similarly positioned knife blade 72 surrounds aperture 46 at the outlet end 40 of conduit 36.

A boss 76 extends forwardly from plate 20. Boss 76 has a bore 78 therethrough for receiving shaft 32 therein. The forward end 80 of shaft 32 is threaded at 82, and a machine screw 84 threadably received therein to project beyond the end 80 of the shaft. A collar 86 is keyed to screw 84 at keyway 88, and a head 90 which is axially adjustable on screw 84 by means of set screw 92 sandwiches collar 86 between the head and boss 76. An arcuately formed slot 94 radiused on the axis of shaft 32 is formed in the rearward facing surface of collar 86. A pin 96 projects forwardly from boss 76 and is received in slot 94. An actuating handle 98 extends radially from collar 86, which permits the collar to be rotated, and together therewith machine screw 84, through an arc limited by slot 94, conveniently about 120°. As will be further described herein, the rotation of collar 86 varies the effective length of shaft 32, hence the screw 84, collar 86 and related parts may be conveniently referred to as a variable length element and denoted by the numeral 100.

Plate 30 is bushed at 110 and mounted to rotate freely on shaft 32. The axial position of plate 30 on shaft 32 may be locked by bayonet flange fitting 112. For this purpose, shaft 32 is provided with a pair of opposed axially aligned grooves 114 extending rearwardly, and communicating at their forward end in a radial groove 116 circumscribing shaft 32. Bayonet flange fitting 112 has a central circular aperture 122 therein with inwardly directed spurs 124 so as to be complementary to the axially grooved cross section of shaft 32. Bayonet flange fitting 112 mounts on shaft 32 to be freely slidable therealong. A stop 126 is provided at the rearward end of shaft 32 for retaining bayonet flange fitting 112 on the shaft.

Figure 2:
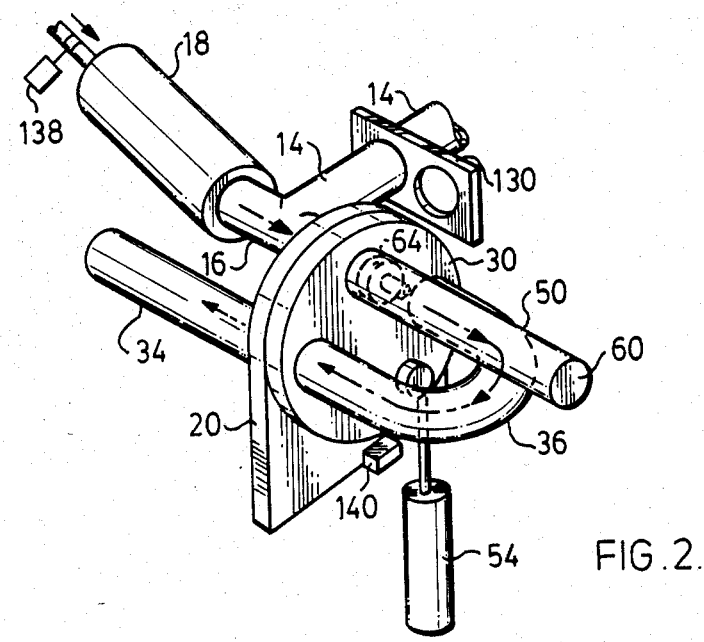
FIG. 2 is a schematic view showing the portions of the apparatus at the first station, at the beginning of the operational cycle.
Figure 3:
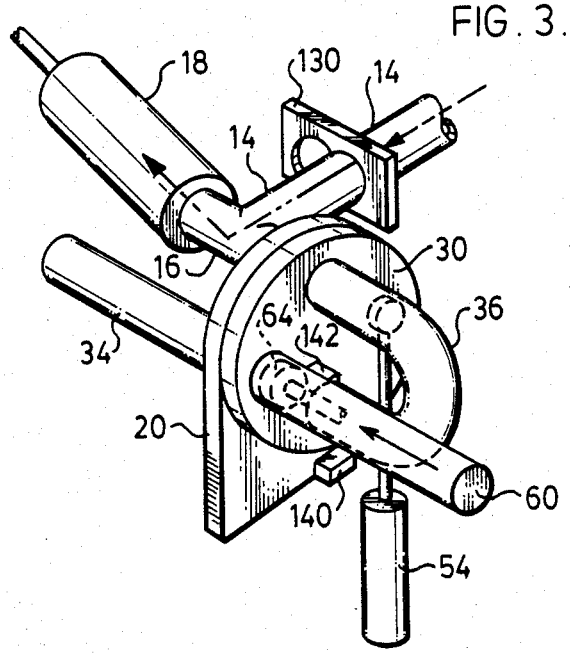
FIG. 3 is similar to FIG. 2, and shows the apparatus at the second station, at the discharge portion of the cycle.
Figure 4:
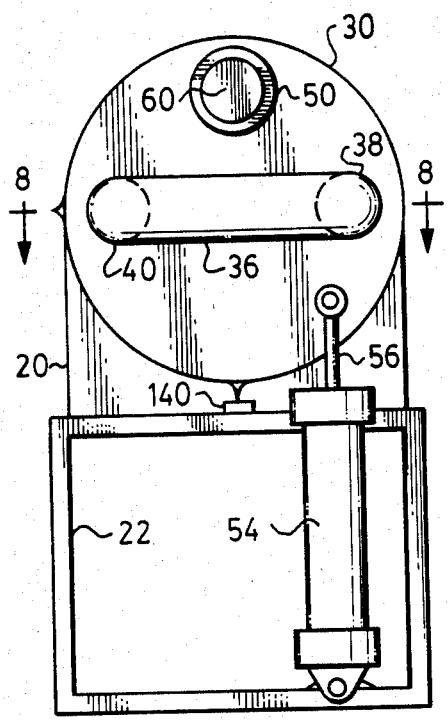
FIGS. 4 and 5 are similar to FIGS. 2 and 3 respectively, as seen in end elevation.
Figure 5:
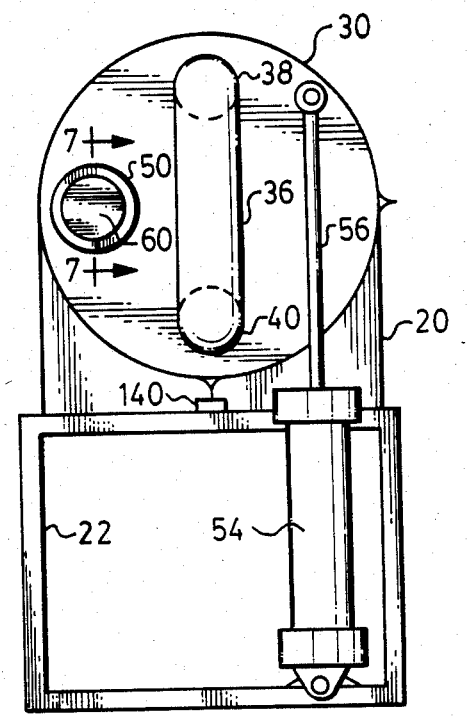
Figure 6:
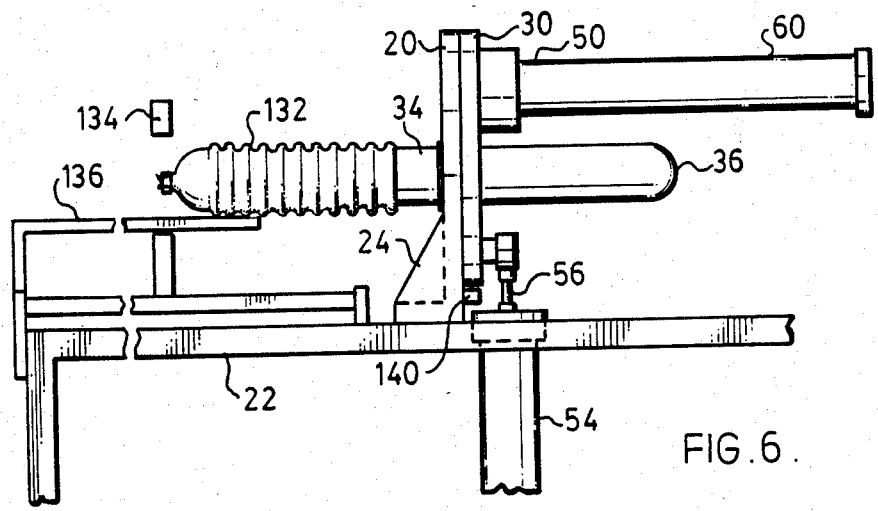
FIG. 6 is similar to FIG. 2, as seen in side elevation.
Figure 7:
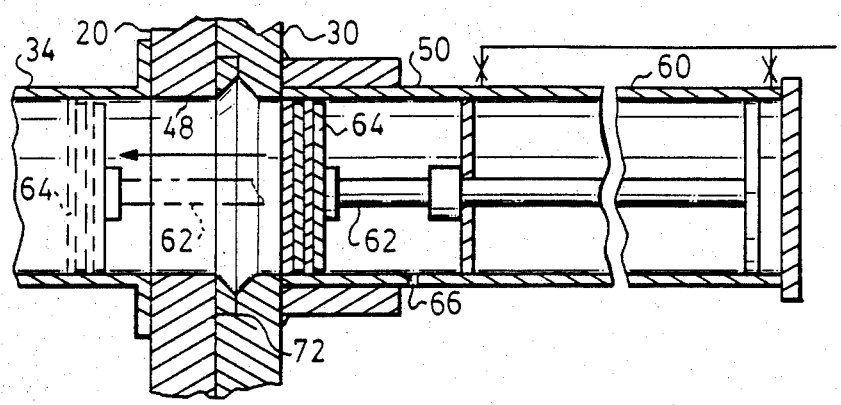
FIG. 7 is a fragmentary section along 7—7 of FIG. 5.
Figure 9:
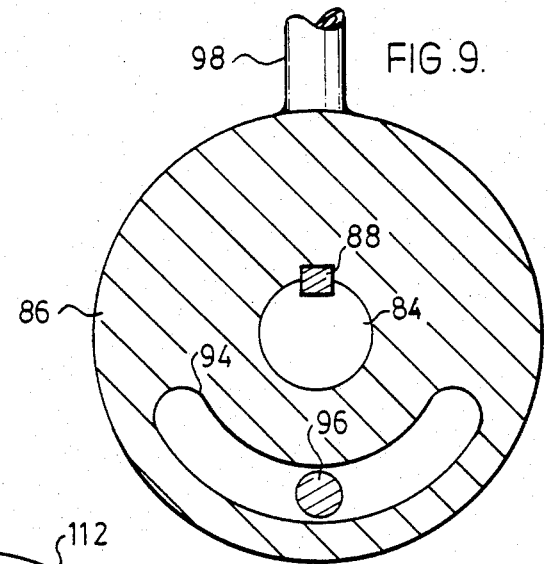
FIGS. 9 and 10 are views along 9—9 and 10—10 respectively of FIG. 8.
Figure 10:
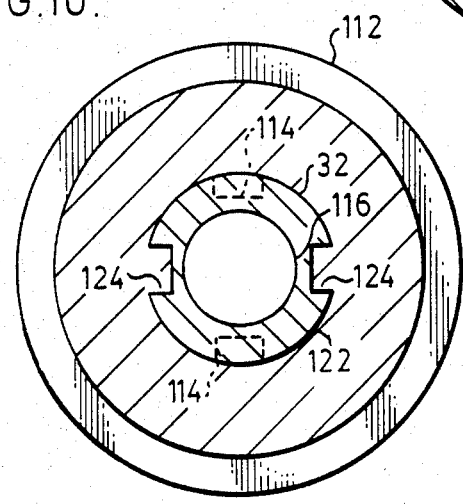

Having described the meat packaging apparatus thus far, the manner and operation thereof will now be described, assuming the apparatus to be in a steady state operating condition. At the beginning of a cycle, as seen in FIG. 2, plate 30 is positioned at the first station by motor 54, whereby conduit 36 is positioned to interconnect supply tube 16 and horn 34; ram 64 is fully retracted by motor 60 and contained within cylinder 50. In this steady state condition conduit 36, supply tube 16, meat portioner 18 and hopper exit tube 14 will all be charged with meat. At the beginning of the cycle, a gate 130, such as described in my U.S. Pat. No. 4,188,767 and which locates in the hopper exit tube 14 is closed, to isolate meat pump 12 from the system. Meat portioner 18 is concurrently activated to discharge its contents, thereby extruding meat charged to the conduit into horn 34. A shirred casing 132 is mounted on horn 34. A stapler 134 for example as described in my U.S. Pat. No. 4,417,434, closes the end of casing 132. Extruded meat will fill casing 132, and the filled casing will move forwardly along a conveyer 136, until such time as a sensor 138 associated with meat portioner 18 detects that a preset quantity of meat has been discharged from the proportioner. The signal for sensor 138 activates motor 54, so as to drive rotary plate 30 towards its second station. Any meat bridging the apertures 42 and 44, and 46 and 48, will be sheared by knives 70 and 72 respectively as plate 30 moves from the first station to the second station. Such shearing action may be enhanced if necessary by providing knives in plate 20 in opposition to knives 70 and 72.

When plate 30 moves to its second station, cylinder 50 is aligned with horn 34. A plate position sensor 140 detects such coincidence, and activates motor 60 towards its extended position, whereby ram 64 extrudes all meat contained in horn 34 into the casing 132. Contemporaneously, gate 130 is opened to connect meat pump 12 to meat portioner 18, which is filled. The flow of meat into conduit 36 is prevented at this time by plate 30, which seals the exit to supply tube 16. It will also be appreciated that the meat charged in conduit 36 is effectively sealed therein by plate 20 at all times when the conduit is not in communication with horn 34, thereby reducing the possibility of contamination of the meat.

When signals are received from proportioner sensor 138 and a ram position sensor 142 that the actions associated with these elements are complete, motor 60 is activated to withdraw ram 64, gate 130 is closed, and motor 54 activated to return plate 30 to the first station, thereby completing the cycle.

It will be appreciated that considerable pressure is necessary to extrude meat through conduit 36 and horn 34, and that this pressure tends to separate plate 30 from plate 20 to cause leakage therebetween. A suitable clamping pressure between plates 20 and 30 may be generated manually. Initially, actuating handling 98 of the variable length element 100 is moved in a direction to unscrew machine screw 84 from shaft 32, thereby effectively increasing the length of the variable length element. Plate 30 is manually urged along shaft 32 towards plate 20, and bayonet flange fitting 112 therewith, until spurs 124 enter radial groove 116 in the shaft, whereupon the fitting may be rotated to lock on the shaft behind plate 30. Actuating handle 98 is then moved to decrease the length of the variable length element 100; collar 86 bears upon boss 76 to preclude a rearward movement of the collar, hence shaft 32 and the components mounted thereon, which is to say rotary plate 30 and bayonet fitting 112, are drawn towards plate 20, thereby exerting a strong clamping pressure between the plates 20 and 30. Gaskets 150 are suitably inlaid in plate 30 to provide a seal between plates 20 and 30.

When a requisite number of cycles have been completed and it is desired to clean the meat packaging apparatus, meat contained in the supply exit tube 14, supply tube 16 and conduit 36 may be conveniently expelled therefrom by the application of compressed air to a nipple (not shown). In order to clean the conduit 36 and related parts and for maintenance purposes, plate 30 may be drawn along shaft 32 to disengage it from facing plate 20. Here, the clamping pressure between the plates is released by suitable actuation of handle 98 to increase the length of the variable length element 100, so permitting bayonet flange fitting 112 to be released and withdrawn along shaft 32, in turn permitting plate 30 to be slid manually along the shaft.

Figure 11:
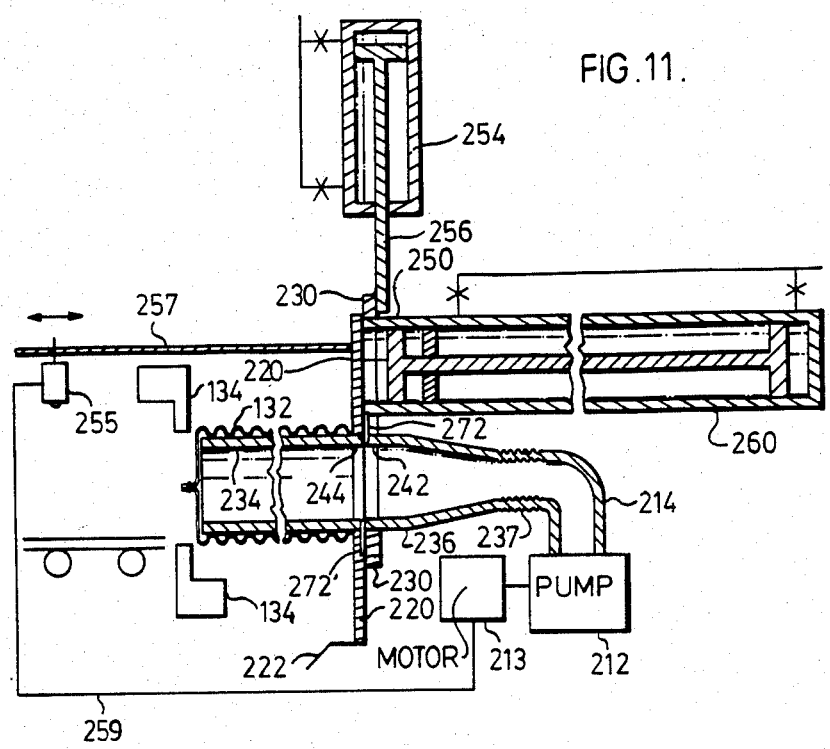
FIG. 11 is an axial cross section of a second embodiment of the invention, shown at the first station at the beginning of the cycle.
Figure 12:
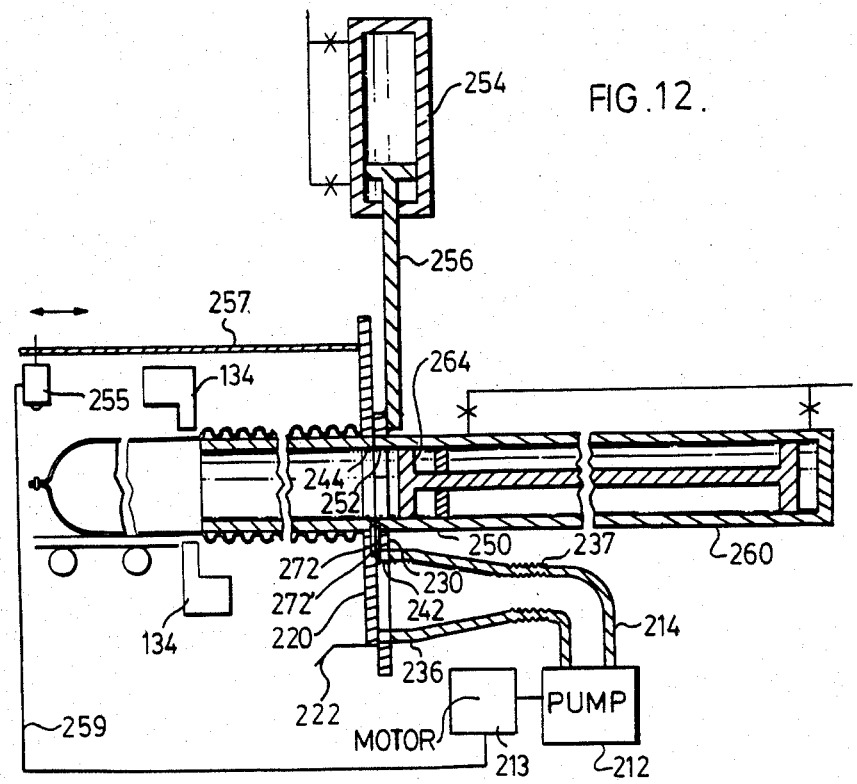
FIG. 12 is similar to FIG. 11, but shows the apparatus at the second station at the beginning of the discharge portion of the cycle.

In accordance with a second embodiment of the invention, as seen in FIGS. 11 and 12, a meat pump 212 driven by a motor 213 has an exit tube 214 which connects to a conduit 236 at a flexible connector joint 237. A plate 220 is rigidly connected to frame 222 of the apparatus. A second plate 230 is mounted in facing relationship to plate 220, so as to be slidable thereon along a rectilinear axis. A horn 234 mounts forwardly from plate 220, and a cylinder 250 mounts rearwardly from plate 230. Conduit 236 also mounts from plate 230, and is spaced apart from cylinder 250 and axially aligned therewith. A pneumatic motor 254 having a connecting rod 256 is drivingly connected to plate 230 and is operative to move the plate between two stations. At the first station, as seen in FIG. 11, the conduit 236 aligns with horn 234, plates 220 and 230 being apertured at 242 and 244 respectively to permit communication between the horn and the conduit. When the apparatus is so positioned, meat pump 212 is activated and meat is thereby extruded through horn 234 to fill a casing 132 thereon. When a predetermined quanity of meat has been extruded, for example as detected by a detector 255 supported from frame 222 by arm 257, a signal is given on line 259 to deactivate motor 213 and to activate motor 254 to move plate 230 to the second station. A knife 272 is let into plate 230 so as to be sandwiched between the facing surface of this plate and plate 220. The cutting edge of knife 272 will have a semi-circular plan-form having a radius approximately equal to the internal radius of horn 234. A similar knife blade 272' is let into plate 220 in opposition to blade 272, the knife blades being diametrically opposed, with the diameter being transverse to the sliding path of plate 230. As plate 230 moves from the first station to the second station, meat bridging between conduit 236 and horn 234 is severed by opposed knife blades 272, 272'. When plate 230 locates at the second station, cylinder 250 is aligned with horn 234. Cylinder 250 forms part of a second pneumatic motor 260, which is operatively connected to drive a ram 264 contained within forward portion of the cylinder. Actuation of motor 260 drives ram 264 forwardly through aperture 252 into horn 234, to expel the meat therefrom into casing 132. At the limit of travel of the ram 264, a signal is provided to retract the ram, following which motor 254 returns plate 230 to the first station to complete the cycle, and contemporaneously, the end of casing 132 is closed by stapler 134. It will be remarked that plate 220 is proportioned whereby it serves to close conduit 236 when this is out of alignment with horn 234, and that horn 234 is sealed by plate 230 when the horn is out of alignment with conduit 236 or cylinder 250, thereby reducing the possibility of contamination of the meat therein.

It will also be appreciated that the meat packaging apparatus of this second embodiment may include meat portioner 18 in the same manner as the first embodiment, or that the meat portioner 18 may be omitted from the apparatus of the first embodiment. It will be apparent that many other departures from the illustrated embodiments may be made. The illustrated embodiments are intended to be exemplary of preferred apparatus for putting the invention into effect, and are not intended to be limitative of at least the broad aspects of the invention claimed.

I claim:

1. Meat packaging apparatus comprising:
   first and second interfacing plates;
   a stuffing horn having an inlet end mounted thereby from said first plate on the outwardly facing surface thereof;
   a conduit having an outlet end mounted thereby from said second plate on the outwardly facing surface thereof and an inlet end separate from said outlet end;
   a ram spaced apart from said conduit and mounted from said second plate on the outwardly facing surfaces thereof;
   means mounting said plates for relative movement whereby the outlet end of said conduit and said ram may be respectively alternately moved into flow communication with said inlet end of said stuffing horn;
   first knife means mounted from the interior facing surface of at least one of said first and second plates and located so as to shear material bridging across the outlet of said conduit and said inlet of said horn, as said plates are relatively moved,
   and motor means for procuring said relative movement.

2. Meat packaging apparatus comprising:
   first and second interfacing plates;
   a horn having an inlet end mounted thereby from said first plate on the outwardly facing surface thereof;
   a U shaped conduit having an inlet end and an outlet end mounted thereby from said second plate on the outwardly facing surface thereof;
   a ram spaced apart from said U shaped conduit and mounted from said second plate on the outwardly facing surfaces thereof;
   means mounting said plates for relative movement whereby the outlet end of said conduit and said ram may be alternately moved into flow communication with said inlet end of said horn;
   a supply tube having an outlet end mounted thereby to said first plate whereby the relative movement of said first and second plates moves said supply tube and said inlet end of said conduit into and out of communication;
   first knife means mounted from the interior facing surface of at least one of said first and second plates and located so as to shear material bridging across the outlet of said conduit and said inlet of said horn, as said plates are relatively moved,
   a second knife means mounted from the interior facing surface of at least one of said first and second plates and located to shear material bridging across the inlet of said conduit and the outlet end of said supply tube as said plates are relatively moved, and motor means for procuring said relative movement.

3. Apparatus as defined in claim 2, wherein said means mounting said plates for relative movement comprises a shaft about which one of said plates is rotatable to procure said relative movement.

4. Apparatus as defined in claim 3, wherein said first plate is fixed.

5. Apparatus as defined in claim 3, wherein said shaft is mounted from said first plate to be axially movable with respect thereto.

6. Apparatus as defined in claim 5, further comprising means associated with said slot to transmit a clamping pressure between said first and second plates.

7. Apparatus as defined in claim 6, wherein said clamping pressure is generated by actuation of a variable length element secured to said shaft.

8. Apparatus as defined in claim 6, wherein said second plate is releasably coupled to said shaft.

9. Apparatus as defined in claim 8 wherein said shaft is axially extended to permit said second plate to be moved therealong when uncoupled to said shaft.

10. Apparatus for use in meat packaging comprising:
first plate from which there is mounted from one side thereof a stuffing horn and a supply conduit;
a second plate interfaced with said first plate;
means mounting said second plate from said first plate for rotary movement with respect thereto between first and second stations;
a U shaped conduit having an inlet end and an outlet end located at the respective axial ends of said U shape mounted at said ends from said second plate;
a ram mounted from said second plate;
said ram and said conduit being laterally spaced apart relative to the longitudinal axis of said ram; such that when said second plate is at said first station said U shaped conduit interconnects said supply conduit and said horn, and when said second plate is at said second station said ram connects to said horn, and said first plate acts to seal the inlet and the outlet ends of said conduit; and
motor means for moving said second plate between said first and second stations.

11. Apparatus as defined in claim 10, wherein said means mounting said second plate includes a shaft mounted from said first plate for axial movement with respect thereto.

12. Apparatus as defined in claim 11, including means for moving said shaft axially to generate a clamping pressure between said first and second plates.

13. Apparatus as defined in claim 10, wherein knife means is provided at the interfacing surface of at least one said plate to shear meat bridging said horn and said U shaped conduit when said second plate is moved from said first to said second stations.

14. Apparatus as defined in claim 11, wherein said shaft is axially extending to permit said second plate to be moved therealong.

15. Apparatus as defined in claim 14 wherein said shaft is provided with an axial groove and a radial groove intersecting therewith, and further including a bayonet fitting slidable along said shaft and engageable in said radial groove to lock thereon in engagement with one said plate.

16. Apparatus for use in meat packaging comprising:
a first plate with a stuffing horn mounted from one side thereof;
a second plate interfacing said first plate;
a conduit having spaced apart inlet and outlet ends mounted from said second plate;
a ram mounted from said second plate;
said ram and said conduit being laterally spaced apart relative to the longitudinal dimension of said ram;
means mounting said second plate from said first plate for movement between a first station, at which said conduit and said horn are interconnected, and a second station at which said ram and said conduit are interconnected and wherein said first plate acts to seal the outlet end of said conduit;
knife means located at the interface between said plates to shear meat bridging between said conduit and said horn as said second plate is moved from said first station to said second station, and motor means for moving said second plate between said stations.

17. Apparatus as defined in claim 16, wherein said conduit connects to a meat supply source by means of a flexible connector.

* * * * *